(12) United States Patent
Peters

(10) Patent No.: US 10,175,959 B2
(45) Date of Patent: Jan. 8, 2019

(54) GENERATION OF USER INTERFACES BY CONSIDERING FIELD IMPORTANCE AND USING SMART CONTROLS AND LAYOUTS

(71) Applicant: Johan Christiaan Peters, St. Leon-Rot (DE)

(72) Inventor: Johan Christiaan Peters, St. Leon-Rot (DE)

(73) Assignee: SAP SE, Walldorf (DE)

( * ) Notice: Subject to any disclaimer, the term of this patent is extended or adjusted under 35 U.S.C. 154(b) by 445 days.

(21) Appl. No.: 14/249,066

(22) Filed: Apr. 9, 2014

(65) Prior Publication Data
US 2015/0293673 A1 Oct. 15, 2015

(51) Int. Cl.
*G06F 3/0481* (2013.01)
*G06F 8/38* (2018.01)
G06F 3/0482 (2013.01)
G06F 17/30 (2006.01)
G06F 3/0484 (2013.01)

(52) U.S. Cl.
CPC .............. *G06F 8/38* (2013.01); *G06F 3/0481* (2013.01); *G06F 3/0482* (2013.01); *G06F 3/04847* (2013.01); *G06F 17/30286* (2013.01)

(58) Field of Classification Search
CPC ........ G06F 8/34; G06F 8/30; G06F 17/30861; G06F 3/04845; G06F 3/04847; G06F 3/04842; H04L 67/02; H04L 29/06095
See application file for complete search history.

(56) References Cited

U.S. PATENT DOCUMENTS

| 6,300,947 B1 * | 10/2001 | Kanevsky ......... G06F 17/30905 |
| | | 707/E17.121 |
| 6,785,866 B1 | 8/2004 | Lewis |
| 7,487,466 B2 | 2/2009 | Peters |

(Continued)

FOREIGN PATENT DOCUMENTS

WO WO 01/09835 A1 2/2001

OTHER PUBLICATIONS

Communication and Extended European Search Report received from EPO Associate dated Aug. 13, 2015 for EP Application No. 15000999.4.-1954; 6 pages.

(Continued)

*Primary Examiner* — Rinna Yi
(74) *Attorney, Agent, or Firm* — Fish & Richardson P.C.

(57) ABSTRACT

The disclosure generally describes computer-implemented methods, computer-readable media, and computer systems for generating user interfaces. Elements available for use in a user interface for an application are identified. Display capabilities of a client device on which the user interface is to be presented are identified. Elements are identified for presentation in the user interface. For each element in the plurality of elements, and depending on the display capabilities of the client device, a determination is made whether to display or hide the element when the user interface is to be presented. A determination is made whether to change the size of the element. A presentation plan is identified for presenting a control associated with the element, wherein the presentation plan includes identifying one or more controls associated with presenting the element. Instructions are provided for presenting the user interface on the client device.

20 Claims, 4 Drawing Sheets

(56) References Cited

U.S. PATENT DOCUMENTS

| | | |
|---|---|---|
| 7,503,009 B2 | 3/2009 | Peters |
| 7,707,512 B2 | 4/2010 | Peters |
| 7,725,815 B2 | 5/2010 | Peters |
| 7,729,956 B2 | 6/2010 | Peters |
| 7,730,427 B2 | 6/2010 | Peters |
| 7,814,165 B2 | 10/2010 | Peters |
| 7,877,685 B2 | 1/2011 | Peters |
| 8,099,419 B2 | 1/2012 | Peters |
| 8,230,335 B2 | 7/2012 | Peters |
| 8,612,471 B2 | 12/2013 | Peters |
| 2007/0143705 A1 | 6/2007 | Peters |
| 2007/0143706 A1 | 6/2007 | Peters |
| 2007/0143708 A1 | 6/2007 | Peters |
| 2007/0152959 A1 | 7/2007 | Peters |
| 2007/0156537 A1 | 7/2007 | Peters |
| 2007/0156820 A1 | 7/2007 | Peters |
| 2007/0157085 A1 | 7/2007 | Peters |
| 2007/0157097 A1 | 7/2007 | Peters |
| 2007/0157115 A1 | 7/2007 | Peters |
| 2007/0233902 A1* | 10/2007 | Trefler ............... G06N 5/025 709/246 |
| 2008/0149712 A1 | 6/2008 | Peters |
| 2008/0282189 A1* | 11/2008 | Hofmann ............ G06F 17/212 715/793 |
| 2011/0154194 A1 | 6/2011 | Mathai et al. |
| 2011/0185040 A1* | 7/2011 | Schmidt ........... G06F 17/30905 709/217 |
| 2012/0054602 A1 | 3/2012 | Demant et al. |
| 2012/0159297 A1 | 6/2012 | Peters |
| 2013/0073606 A1* | 3/2013 | Law-How-Hung ......... G06F 17/30893 709/203 |
| 2013/0147845 A1* | 6/2013 | Xie ................. G06F 3/14 345/660 |
| 2013/0173486 A1 | 7/2013 | Peters et al. |
| 2013/0174093 A1 | 7/2013 | Peters et al. |
| 2013/0191767 A1 | 7/2013 | Peters et al. |
| 2013/0191778 A1 | 7/2013 | Peters et al. |
| 2014/0048599 A1 | 2/2014 | Peters |

OTHER PUBLICATIONS

Linton M.A. et al "Composing User Interfaces with Interviews" Computer, US, IEEE Computer Society, Long Beach., CA, US. vol. 22, No. 2, Feb. 1, 1989, pp. 8-22, XP000186141.

Haarslev V et al.: "Visualization and graphical layout in object-oriented systems" Journal of Visual Languages and Computing, Mar. 1992, UK, vol. 3, No. 1, pp. 1-23, XP000912232.

Hostetter M et al: "Curl a Gentle Slope Language for the Web" World Wide Web Journal, US, Sebastopol, CA, US, 1997, pp. 121-134, XP000910842.

Myers B A et al. "Garnet Comprehensive Support for Graphical, Highly Interactive User Interfaces" Computer, US, IEEE Computer Society, Long Beach., CA, US, vol. 23, No. 11, Nov. 1, 1990, pp. 71-85., XP000173297.

\* cited by examiner

| Field 1 | Field 2 | Field 3 | } 204 |
|---------|---------|---------|-------|
| A | 1 | 3 | } 202a |
| A | 1 | 2 | |
| A | 1 | 1 | |
| A | 1 | 2 | |
| A | 1 | 2 | |
| A | 1 | 2 | |
| C | 2 | 2 | |
| B | 2 | 2 | |
| B | 2 | 3 | } 202b |
| C | 2 | 2 | |
| B | 2 | 2 | |
| B | 2 | 2 | |

202 spans Field 1, Field 2, Field 3

| | From (214) | To (216) | Predictive Value (212) |
|---|------------|----------|------------------------|
| 210a { | _214a_ Field 1 | _216a_ Field 2 | _212a_ 1.0 |
| | Field 1 | Field 3 | 2.0 |
| 210b { | _214b_ Field 2 | _216b_ Field 1 | _212b_ 1.5 |
| | Field 2 | Field 3 | 2.5 |
| | Field 3 | Field 1 | 2.0 |
| 210c { | _214c_ Field 3 | _216c_ Field 2 | _212b_ 1.67 |

| | | 224a | 224b | 224c | 230 | 234 |
|---|---|------|------|------|-----|-----|
| | 226 ↴ | Field 1 | Field 2 | Field 3 | Field Importance | Scaled Importance |
| 222a { | Field 1 | _226a_ 0.300 | _228b_ 0.200 | _228d_ 0.150 | _230a_ 0.650 | 0.355 |
| 222b { | Field 2 | _228a_ 0.133 | _226b_ 0.200 | _228f_ 0.096 | _230b_ 0.429 | 0.235 |
| 222c { | Field 3 | _228c_ 0.075 | _228e_ 0.072 | _226c_ 0.600 | _230c_ 0.747 | 0.408 |
| | | | | | _232_ 1.83 | _236_ 1.00 |

224 spans 224a, 224b, 224c

GENERATION OF USER INTERFACES BY CONSIDERING FIELD IMPORTANCE AND USING SMART CONTROLS AND LAYOUTS

CROSS-REFERENCE TO RELATED APPLICATIONS

This application is related to co-pending U.S. patent application Ser. No. 14/249,089, filed on Apr. 9, 2014, and Entitled "Dynamic User Interface Layout Algorithm", the entire contents of which are hereby incorporated by reference.

TECHNICAL FIELD

The present disclosure relates to computer-implemented methods and systems for generating user interfaces.

BACKGROUND

User interfaces can be designed and/or presented in many different ways and can include several different elements, including field names and values, images, controls such a lists, radio buttons, check boxes, and/or other elements. The design and presentation of user interfaces can depend, for example, on the importance of fields, available space for a user interface, display capabilities of a device on which a user interface is presented, and/or other factors.

SUMMARY

The present disclosure generally describes computer-implemented methods, computer-readable media, and computer systems for generating user interfaces. As an example, a plurality of elements available for use in a user interface for an application is identified. Display capabilities of a client device on which the user interface is to be presented are identified. Elements for presentation in the user interface are identified. Identification includes, for each element in the plurality of elements and depending on the display capabilities of the client device, determining whether to display or hide the element when the user interface is to be presented, determining whether to change the size of the element for use when the user interface is to be presented, and identifying a presentation plan for presenting a control associated with the element for use when the user interface is to be presented, wherein the presentation plan includes identifying one or more controls associated with presenting the element. Instructions are provided for presenting the user interface on the client device.

One computer-implemented method includes: identifying a plurality of elements available for use in a user interface for an application; identifying display capabilities of a client device on which the user interface is to be presented; identifying elements for presentation in the user interface including, for each element in the plurality of elements and depending on the display capabilities of the client device: determining whether to display or hide the element when the user interface is to be presented, determining whether to change the size of the element for use when the user interface is to be presented, and identifying a presentation plan for presenting a control associated with the element for use when the user interface is to be presented, wherein the presentation plan includes identifying one or more controls associated with presenting the element; and providing, using one or more processors, instructions for presenting the user interface on the client device.

Other implementations include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, the display capabilities include a screen size and orientation.

In a second aspect combinable with any of the previous aspects, determining whether to display or hide an element is based, at least in part, on an importance of a given element.

In a third aspect combinable with any of the previous aspects, changing the size of an element includes one of changing the size of an image or changing the font size of text associated with the element.

In a fourth aspect combinable with any of the previous aspects, changing the size of the image includes cropping the image.

In a fifth aspect combinable with any of the previous aspects, the method further includes providing instructions for changing a presentation of the user interface for execution when the orientation of the device is changed.

In a sixth aspect combinable with any of the previous aspects, a control type of the control is selected from a group comprising a selection menu, a drop-down list box, a selection list, and a set of radio buttons.

In a seventh aspect combinable with any of the previous aspects, identifying the elements for presentation includes using rules based at least in part on specific values associated with display characteristics of devices.

In an eighth aspect combinable with any of the previous aspects, the elements are selected from a group comprising a field and an image.

In a ninth aspect combinable with any of the previous aspects, the instructions identify, for each element, whether the element is to be included, the size to be used for presenting the element, if included, and the presentation plan for presenting the control associated with the element, if included.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIG. 2A shows an example value table that that identifies combinations of values for fields, according to an implementation.

FIG. 2B shows a table that includes example predictive values indicating average variations of pairs of fields, according to an implementation.

FIG. 2C shows a table of example importance values, according to an implementation.

Like reference numbers and designations in the various drawings indicate like elements.

DETAILED DESCRIPTION

Figure 1:
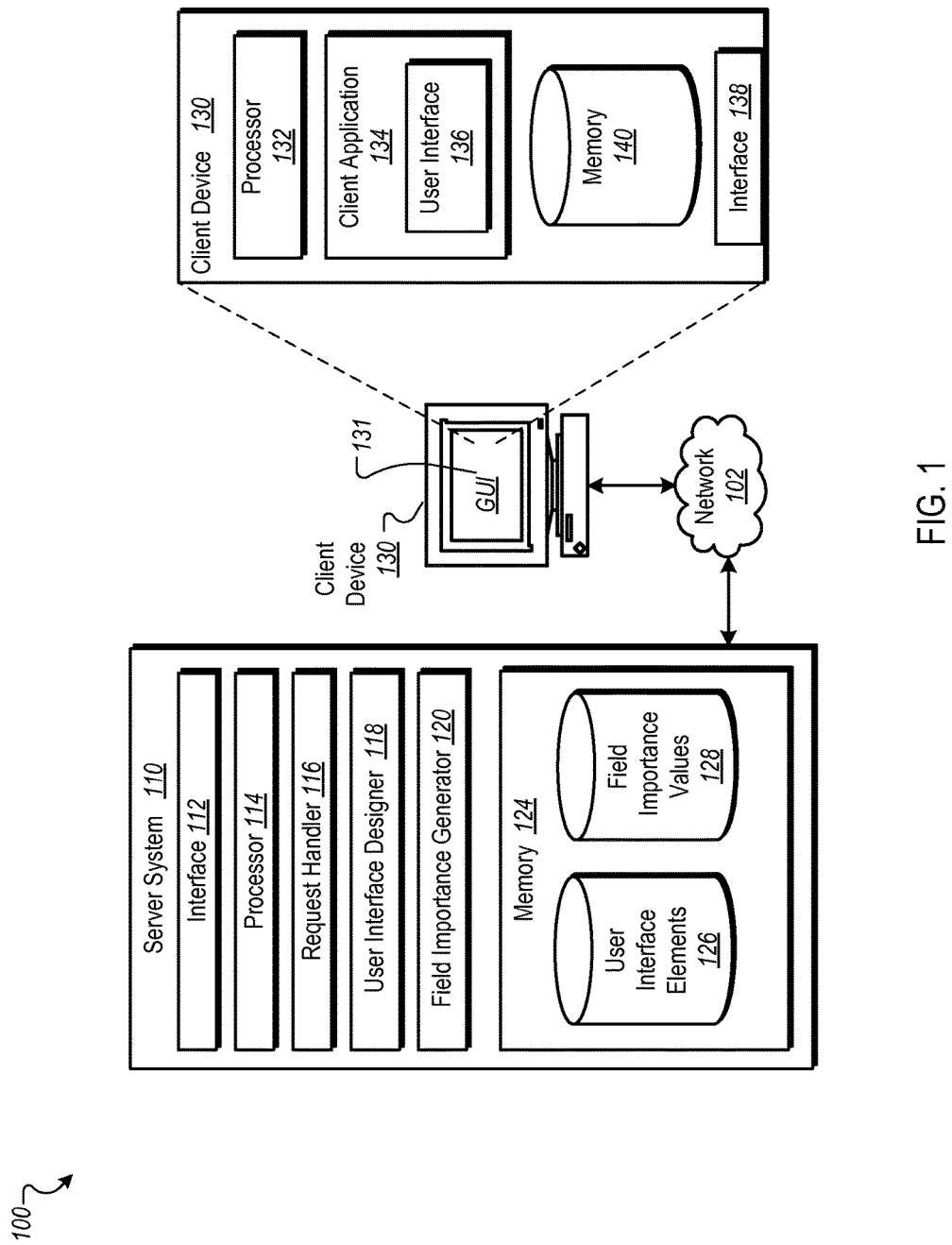
FIG. 1 is a block diagram illustrating an example environment for generating user interfaces, according to an implementation.

This disclosure generally describes computer-implemented methods, computer-readable media, and computer systems for generating user interfaces. The following description is presented to enable any person skilled in the art to practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

The subject matter described in this specification can be implemented in particular implementations so as to realize one or more of the following advantages. User interfaces can be generated automatically based on information associated with the importance of database fields and/or the device on which the user interface is to be presented. The importance of information can be determined dynamically based on actual data, which means that the information can be tailored to specific and arbitrary contexts, such as a specific user, a group of countries, or in other ways.

Automatic generation of user interfaces, e.g., using database fields, can be challenging for various reasons. For example, available space in a user interface (UI) can be limited. This can require a decision, for example, as to how information in the UI is to be shown, including which fields to show (or hide) and how to present them. In some implementations, deciding which fields to include in the UI can be based on a generated measure of the importance, such as field importance that can be determined in the context of users, use cases, and/or relationships among fields.

In some implementations, fields that are determined to be more important can be given priority in rendering within the UI. Less important fields, for example, can be rendered if space exists in the UI, e.g., depending on the device on which the UI is presented. In some implementations, more important fields can be rendered larger (i.e., using more display space) than less important fields. Other differences in rendering fields and/or other presentation techniques can be used. How a field is rendered, e.g., including its size, can determine how fast and easy the field can be entered and/or edited by a user using the UI.

There are different ways of determining the importance of fields. For example, initial importance can be directly determined at design time, by a designer, during use, by users or consultants, such as in performing use cases, or in other ways. Determining initial importance of fields can be important because this can allow users to personalize UIs (e.g., based on perceived field importance), and consultants can optimize UIs beyond, or in addition to, the capabilities of an automatic system to personalize/optimize UIs. Determining initial importance of fields can also be important to provide initial settings in an empty or new system.

In some implementations, techniques of automatically determining field importance can include, for example, measuring the importance of a field based on the variability of the field's values. Some techniques can use, for example, a user's context associated with fields. As an example, assume that a sales manager always sells products or services to one company, but the delivery location can be any of three different warehouses. In this example, the importance of the warehouse field can be deemed higher because the warehouse field is most likely to be edited. Further, the customer field can be rendered smaller, for example, because the customer field only appears on the UI for reference and can be implied by the warehouse field.

In some implementations, more sophisticated ways of automatically determining field importance can include using the predictive value of a field. For example, assume that a sales manager has 10 customers with 1-3 delivery locations each, and 1-2 purchasers at each customer who are responsible for different product groups. Also assume that product groups are typically, though not always, stored in different warehouses. In some implementations, a statistical analysis can determine that a purchaser name is a very strong predictor of delivery location and a 100% predictor of the customer's name. In this case, the purchaser's name can be determined to be the more important field.

In some implementations, in addition to using the predictive value of fields as a measure of importance, the predictive value of fields can also be used to group fields and to determine the order in which the fields are shown in the UI. For example, when a customer record contains address fields, there can be a high correlation between the fields. Correlations that are determined manually or automatically can be used to group related fields.

In some implementations, techniques can be used to automatically design, and provide instructions for rendering, user interfaces. For example, the techniques can include deciding which fields are to be included (e.g., based on field importance) and which user elements are to be used. User interface elements can include, for example, selection menus, drop-down list boxes, images, selection lists, sets of radio buttons, and/or other elements.

In some implementations, the content and layout of a user interface can be determined in real time, e.g., in response to a request received from a client device for instructions for presenting a user interface. For example, the content and layout that are determined can depend on the display capabilities of the client device. Further, changes to the content and/or layout can occur, for example, if the layout of the client device's screen changes, if a window for the UI is re-sized, and/or for other reasons.

FIG. 1 illustrates an example environment 100 for generating user interfaces, according to an implementation. Specifically, the illustrated environment 100 includes at least one server system 110, and at least one client device 130, all of which are communicably coupled using a network 102. For example, a user interacting with a user interface 136 presented on the client device 130 may access information maintained by, or accessible through, the server system 110.

The server system 110 comprises an electronic computing device operable to generate instructions for providing the layout and contents of user interfaces. The server system 110 can also receive requests, e.g., for data to be provided within user interfaces (e.g., user interface 136) on devices in communication with the server system 110.

Although FIG. 1 illustrates a single server system 110, the environment 100 can be implemented using two or more server systems 110. The environment 100 can also be implemented using computers other than servers, including a server pool. Indeed, components of the environment 100 may be any computer or processing device. According to some implementations, components of the environment 100 can also include, or be communicably coupled with, an e-mail server, a web server, a caching server, a streaming data server, and/or other suitable server(s). In some implementations, components of the environment 100 can be distributed in different locations and coupled using the network 102.

The server system 110 includes an interface 112, a processor 114, a request handler 116, a user interface designer 118, a memory 124, and other elements as described below. The interface 112 is used by the server system 110 for communicating with other systems in a distributed environment, connected to the network 102 (e.g., the client device 130), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The request handler 116 can, for example, handle requests received from systems and/or devices external to the server system 110. For example, the request handler 116 can handle a request received from the client device 130 to provide information for presenting a user interface 136.

The user interface designer 118 (or sub-components thereof) can automatically design and prepare user interfaces. For example, the user interface designer 118 can use field importance information provided by the field importance generator 120 to determine which fields have priority. Thus, when not enough space exists for presenting all desired fields, output of the field importance generator 120 can be used to decide which fields to retain and which fields to omit, the display sizes of fields, and/or for other things. For example, for each element in a user interface and depending on the display capabilities of a client device, the user interface designer 118 can determine whether to display or hide or the display size of a particular element when the user interface is to be presented. The user interface designer 118 can also determine whether to change the size of the element and identify a presentation plan for presenting a control associated with the element for use when the user interface is to be presented/re-represented (e.g., when a UI is resized). Identifying the presentation plan, for example, can include identifying one or more controls associated with presenting the element.

The server system 110 also includes the memory 124. Although illustrated as a single memory 124 in FIG. 1, two or more memories may be used according to particular needs, desires, or particular implementations of the environment 100. While memory 124 is illustrated as an integral component of the server system 110, in alternative implementations, memory 124 can be external to the server system 110 and/or the environment 100. In some implementations, memory 124 includes the user interface elements 126 and/or field importance values 128. Other components within the memory 124 are possible. The user interface elements 126, for example, can include, for a particular UI, or as potential elements in the particular UI, selection menus, drop-down list boxes, images, selection lists (e.g., including check boxes), sets of radio buttons, and/or other elements. Field importance values 128, for example, can include information that identifies the importance of fields that are presentable in a particular user interface.

The illustrated environment of FIG. 1 also includes the client device 130, or multiple client devices 130. The client device 130 may be any computing device operable to connect to, or communicate with, at least the server system 110 over the network 102 using a wire-line or wireless connection. In general, the client device 130 comprises an electronic computer device operable to receive, transmit, process, and store any appropriate data associated with the environment 100 of FIG. 1.

The illustrated client device 130 further includes at least one client application 134. Each client application 134 can be any type of application that allows the client device 130 to request and view content on a graphical user interface (GUI) 131, such as an application with a user interface 136, a web browser, or any other application that may display or use content.

The illustrated client device 130 further includes an interface 138, a processor 132, and a memory 140. The interface 138 is used by the client device 130 for communicating with other systems in a distributed environment—including within the environment 100—connected to the network 102. The interface 138 can support, for example, requests sent by the client device 130 to the server system 110. Generally, the interface 138 comprises logic encoded in software and/or hardware in a suitable combination and operable to communicate with the network 102. More specifically, the interface 138 may comprise software supporting one or more communication protocols associated with communications such that the network 102 or interface's hardware is operable to communicate physical signals within and outside of the illustrated environment 100.

As illustrated in FIG. 1, the client device 130 includes the processor 132. Although illustrated as the single processor 132 in FIG. 1, two or more processors 132 may be used according to particular needs, desires, or particular implementations of the environment 100. Generally, the processor 132 executes instructions and manipulates data to perform the operations of the client device 130. Specifically, the processor 132 executes the functionality required to send requests to, and process responses from, and the server system 110.

The illustrated client device 130 also includes a memory 140, or multiple memories 140 storing objects and/or data associated with the purposes of the client device 130 within the environment 100, including, in some implementations, for purposes such as backup, caching, and the like.

The illustrated client device 130 is intended to encompass any computing device configured and/or operable to connect to or to communicate with at least the server system 110 using the network 102. In some implementations, the client device 130 may comprise a computer that includes an input device, such as a keypad, touch screen, or other device that can accept user information, and an output device that conveys information associated with the client device 130, including digital data, visual information, or GUI 131, as shown with respect to and included by the client device 130. The GUI 131 interfaces with at least a portion of the environment 100 for any suitable purpose, including providing user interfaces, generating a visual representation of a web browser, and for other purposes. There may be any number of client devices 130 associated with, or external to, the environment 100. For example, while the illustrated environment 100 includes one client device 130 communicably coupled to the server system 110 using network 102, alternative implementations of the environment 100 can include any number of client devices 130 suitable to the purposes of the environment 100. Additionally, there may also be one or more additional client devices 130 external to the illustrated portion of the environment 100 that are capable of interacting with the environment 100 using the network 102. Further, the term "client" and "user" may be used interchangeably as appropriate without departing from the scope of this disclosure. Moreover, while the client device 130 is described in terms of being used by a single user, this disclosure contemplates that many users may use one computer, or that one user may use multiple computers.

FIG. 2A shows an example value table 200 that that identifies combinations of values 202 for fields 204, according to an implementation. For example, the values 202 can be existing values for fields 204 (e.g., Field 1 or Fields 1, 2, and 3) that are presented in a user interface. Fields 1, 2, and 3, for example, can represent a users' name, address, and phone number, respectively, or some other data values, and each row in the table 200 can represent a different person. For example, in row 202a of the table 200, the value of Field 1 is A, the value of Field 2 is 1, and the value of Field 3 is 3. In another example, in row 202b of the table 200, the value of Field 1 is B, the value of Field 2 is 2, and the value of Field 3 is 3. While there are only three fields shown in the table 200, there can be many more fields, as well as many more combinations of field values, and many more rows (entries) than the twelve rows shown in FIG. 2A for table 200.

FIG. 2B shows a table 210 that includes example predictive values 212 indicating average variations of pairs of fields, according to an implementation. For example, each of the predictive values 212 can be determined by averaging, for each unique value of a from_field 214, the number of unique values of a respective to_field 216. For example, row 210a is associated with a predictive value 212a (e.g., 1.0) of values in to_field 216a (e.g., Field 2) based on values of from_field 214a (e.g., Field 1). Referring to FIG. 2A, for example, when Field 1 has a value of A, Field 2 always has a value of 1. When Field 1 has a value of B, for example, Field 2 always has a value of 2. When Field 1 has a value of C, for example, Field 2 always has a value of 2. As a result, the predictive value 212a is 1 (e.g., (1+1+1)/3), which is the average of the variations of Field 2 given Field 1. A predictive value of 1 can occur, for example, if Field 1 is entirely predictive of Field 2, such as a person's name predicting a unique identifier (e.g., a driver's license number).

In another example, row 210b is associated with a predictive value 212b of values in a to_field 216b (e.g., Field 1), based on values of from_field 214b (e.g., Field 2). When Field 2 has a value of 1, for example, Field 1 always has a value of A, thus one value. When Field 2 has a value of 2, for example, Field 1 can have a value of B or C, thus two values. As a result, the predictive value 212b is 1.5, which is the average of the variations of Field 1 given Field 2.

In yet another example, row 210c is associated with a predictive value 212c of values for a to_field 216c (e.g., Field 2) based on values of from_field 214c (e.g., Field 3). When Field 3 has a value of 1, for example, Field 2 always has a value of 1, thus one value. When Field 3 has a value of 2, for example, Field 2 can have a value of 1 or 2, thus two values. When Field 3 has a value of 3, for example, Field 2 can have a value of 1 or 2, thus two values. As a result, the predictive value 212c is 1.67 (e.g., (1+2+2)/3), which is the average of the variations of Field 2 given Field 3.

The remaining predictive values 212 can be determined in same way. As a result, table 210, for example the predictive values 212, can represent a predictability from one field to another.

FIG. 2C shows a table 220 of example importance values 222, according to an implementation. For example, the importance values 222 are associated with the fields of FIG. 2A and are based, at least in part, on the predictive values 212 of the table 210. The importance values 222 stored in the table for rows 222a, 222b, and 222b, are associated with Fields 1, 2 and 3, respectively. Importance values 222 can be based, for example, on the other fields. For example, columns 224a-224c can include important values that correspond to contributions to importance values 222 of Fields 1, 2, and 3, respectively.

Cells 226a-226c can represent, for example, initial priority values for the Fields 1-3. In some implementations, the initial priority of a respective field can be calculated by counting unique values for the field. In some implementations, this can be done by performing a SQL GROUP BY statement and counting the number of records returned. In some implementations, the values can be scaled, e.g., summed to 1.0 or some other value so as to be affected by values associated with other fields when, as described below, determining field importances. Other scaling or normalization is possible.

The cells 228a-228f at which the columns 224a-224c intersect with the rows 222a-222c, for example, contain values that represent the importance of one field to another. For example, cell 228a represents the importance of field 1 to_field 2, where the importance is based on predictability of one field given another field.

In some implementations, a field importance 230 can be determined for each of the fields, e.g., Fields 1, 2, and 3. For example, values of field importance 230a-230c can be based on initial priority values in cells 226a, 226b, and 226c for Fields 1, 2, and 3 respectively and predictive values of other fields, e.g., as:

$$\text{field\_importance}_j = \text{initial\_priority}_j + \sum_{i \ne j}^{n} \frac{\text{initial\_priority}_i}{(\text{predictive\_value}(j \text{ to } i))^2} \quad (1)$$

where field_importance$_j$ is the jth field importance 230, initial_priority$_j$ is the jth initial priority 226, and predictive_value(j to i) is the corresponding predictive value 212 from the jth field to the other fields. For example, the field importance 230a of Field 1 (e.g., 0.625) is computed from the initial priority of Field 1 (e.g., 0.3), plus the sum, for all other fields (e.g., Fields 2 and 3), of the initial priority 226 of that other field divided by the square of the predictive value of Field 1 to that other field. Thus, field_importance$_j$=0.3+0.2/(1*1)+0.5/(2*2)=0.3+0.2+0.125=0.625. The values 0.2 and 0.125 in the preceding sum are shown in the table 220 in cells 228b and 228d, respectively, indicating contributions to the field importance from the other fields. Thus, field importance 230a is a measure, for example, of the importance of Field 1, including the effect of Field 1 in predicting the other fields. Similarly, Equation 1 can be used to determine a field importance 230b of Field 2 (e.g., 0.413)

as the sum of cells 226b, 228a, and 228f. Also, a field importance 230c of Field 3 (e.g., 0.647) is the sum of cells 226c, 228c, and 228e.

Figure 3:
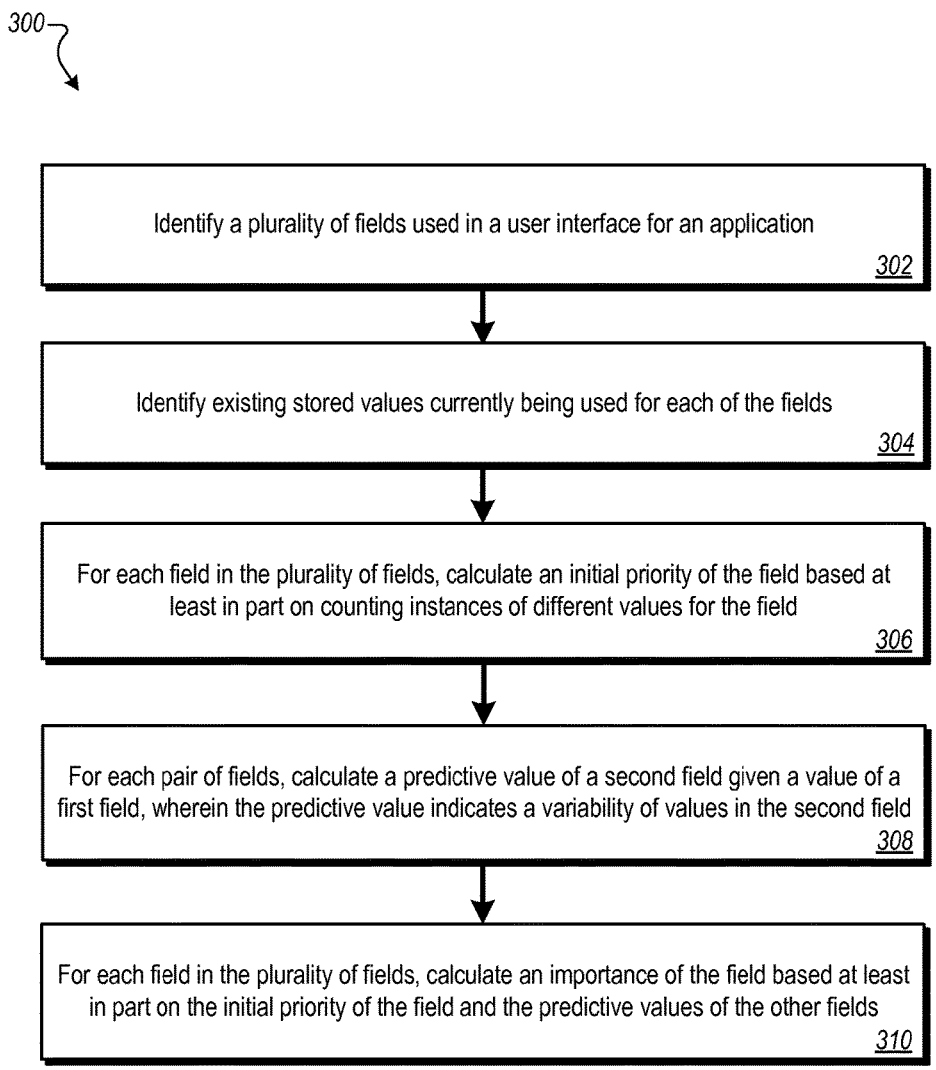
FIG. 3 shows a flowchart of an example of a method for calculating the importance of fields, according to an implementation.

FIG. 3 shows a flowchart of an example of a method 300 for calculating the importance of fields, according to an implementation. For clarity of presentation, the description that follows generally describes method 300 in the context of FIGS. 2A-2C. However, it will be understood that the method 300 may be performed, for example, by any other suitable system, environment, software, and hardware, or a combination of systems, environments, software, and hardware as appropriate.

At 302, a plurality of fields used in a user interface for an application are identified. For example, referring to FIG. 2A, the field importance generator 120 can identify the fields 204, e.g., Fields 1, 2, and 3 that can be fields used in a user interface.

At 304, existing stored values currently being used for each of the fields are identified. For example, the field importance generator 120 can identify the field values 202, e.g., value combinations for Fields 1, 2, and 3, as described above with reference to FIG. 2A.

At 306, for each field in the plurality of fields, an initial priority of the field is calculated based at least in part on counting instances of different values for the field. For example, the field importance generator 120 can determine an initial priority of each field, such as by determining the variance of each by counting the number of instances of each value of the field. In some implementations, counting the instances can be done by performing a SQL GROUP BY statement and counting the number of records returned. Referring to table 220 in FIG. 2C, for example, the initial priority of each field can be represented as values in cells 226a, 226b, and 226c for Fields 1, 2 and 3 respectively.

At 308, for each pair of fields, a predictive value of a second field is calculated given a value of a first field, wherein the predictive value indicates a variability of values in the second field. For example, the field importance generator 120 can determine the predictive values 212 based on the value combinations for Fields 1-3, as described above.

In some implementations, the predictive value can be an average or other aggregating function, such as a weighted average. For example, the predictive values 212 that are calculated can account for how many records have the to_field/from_field value pair. Larger numbers of records that have those to_field/from_field value pairs can be weighted higher in calculating the predictive values 212.

At 310, for each field in the plurality of fields, an importance of the field is calculated based at least in part on the initial priority of the field and the predictive values of the other fields. For example, the field importance generator 120 can calculate the field importances 230a-230c for Fields 1-3, respectively, as described above with reference to FIG. 2C. In some implementations, the server system 110 can store the field importances 230a-230c and other related values in the data store of field importance values 128.

In some implementations, the importance of a given field can be a sum of the initial priority of the given field and the cross priority of each of the other fields, including, for each of the other fields, the initial priority of a particular field of the other fields divided by a square of the predictive value of the particular field given the value of the given field. For example, field importances can be calculated using Equation 1.

In some implementations, the method 300 can further include calculating a scaled importance of each field based on the calculated importance of the field and further scaled by a sum of the initial priorities of the fields. For example, scaled importances 234 can be calculated, by dividing field importances 230 by the sum of the initial priorities 226 (e.g., 1.1)

In some implementations, the scaled importance of each field can be calculated based on the calculated importance of the field and further scaled by a sum of the field importances of the fields. For example, the field importances 230 can sum to a field importance sum 232. The scaled importances 234 can be calculated, for example, by dividing field importances 230 by the field importance sum 232. As a result, scaled importances 234 can sum to a scaled importance sum 236 of one.

In some implementations, the method 300 can further include using the calculated importance of fields to identify a layout of fields of the user interface based at least on the importance. For example, the server system 110 can provide the field importance values 128 to software developers who can use the information to lay out user interfaces that include one or more of the fields.

In some implementations, some fields can be omitted from the user interface based, at least in part, on space available in the user interface and the importance of fields. For example, software developers can use the field importance values 128 to determine which fields, if any, can be eliminated from the user interface, such as fields that are entirely predictable from another field and need not be displayed (or displayed as prominently).

In some implementations, some fields can be presented differently based on importance. For example, software engineers can design the user interface such that the importance of a field determines the presentation of the field using one or more of field size, number of lines or rows used to represent the field, and/or font size.

Figure 4:
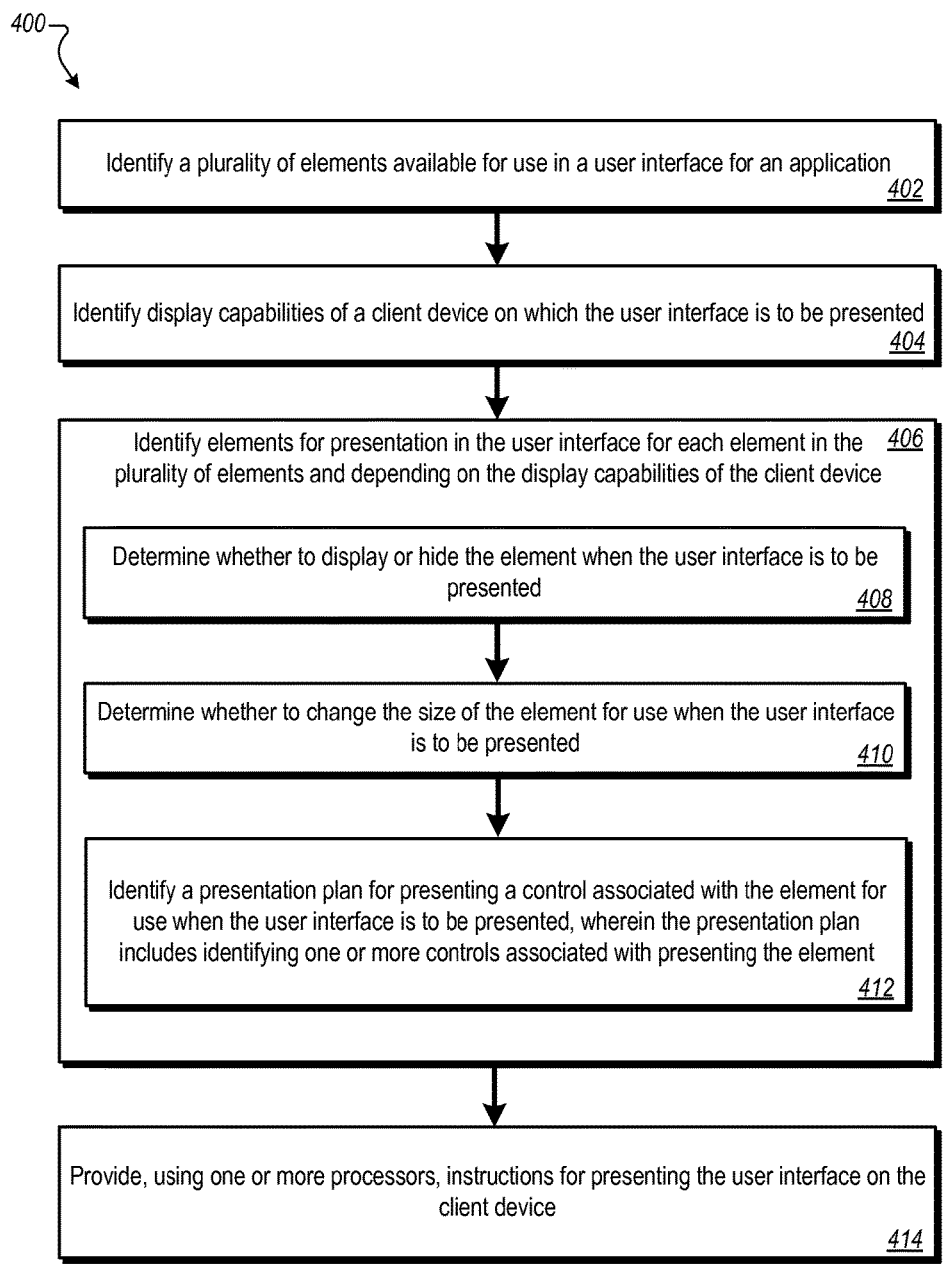
FIG. 4 shows a flowchart of an example of a method for determining ways for presenting elements in a user interface, according to an implementation.

FIG. 4 shows a flowchart of an example of a method 400 for determining ways for presenting elements in a user interface, according to an implementation. For clarity of presentation, the description that follows generally describes method 400 in the context of FIGS. 2A-2C and 3. However, it will be understood that the method 400 may be performed, for example, by any other suitable system, environment, software, and hardware, or a combination of systems, environments, software, and hardware as appropriate.

At 402, a plurality of elements available for use in a user interface for an application are identified. For example, the user interface designer 118 can identify a group of elements from the user interface elements 126 that are associated with and/or to be used in a user interface that is to be presented on the client device 130, e.g., in the user interface 136.

At 404, display capabilities of a client device on which the user interface is to be presented are identified. As an example, the request handler 116 can determine display capabilities of the client device 130, such as the type of client device.

In some implementations, the display capabilities can include a screen size and orientation. For example, display capabilities associated with the received request can identify the screen size in pixels (or other measure) and whether the current orientation of the client device 130 is landscape or portrait.

At 406, elements are identified for presentation in the user interface. For example, the user interface designer 118 can identify specific ones of the user interface elements 126 (e.g., fields, images, etc.) for presentation in the user interface 136.

In some implementations, identifying the elements for presentation can include using rules based at least in part on specific values associated with display characteristics of devices. For example, selection of the elements can depend on logic embedded in hyper-text markup-language (HTML) or other code that is used to select the elements based on client device capabilities. For example, the HTML code can include custom tags that define nested controls and layouts. Each section of code in the HTML code, for example, can include a rule that defines when this section is to be used. The rules can be evaluated, for example, top to bottom, with the first sect ion selected. Other rules, including more complicated selection algorithm rules, can be used.

At 408, for each element in the plurality of elements and depending on the display capabilities of the client device, a determination is made whether to display or hide the element when the user interface is to be presented. For example, based on the amount of space available for rendering the UI on the user interface 136, the user interface designer 118 can select fields, images and/or other elements that will fit in the user interface 136, according to the rules.

In some implementations, determining whether to display or hide an element is based, at least in part, on an importance of a given element. For example, selection of particular fields to be displayed and other particular fields to be hidden can depend on field importance information stored in the field importance values 128.

At 410, a determination is made whether to change the size of the element for use when the user interface is to be presented. For example, some elements can be resized to fit in the user interface, such as changing the size of an image or changing the font size of text associated with the element. Changing the size of an image, for example, can be done by shrinking the image (e.g., to make the image smaller), by cropping, or by other techniques.

At 412, a presentation plan is identified for presenting a control associated with the element for use when the user interface is to be presented, wherein the presentation plan includes identifying one or more controls associated with presenting the element. For example, the user interface designer 118 can have a plan for presenting a particular element as a drop-down menu when X amount of space is available for presenting the element, or presenting the particular element as a set of radio buttons when Y amount of space is available (e.g., greater than X). Example control types can include selection menus, drop-down list boxes, selection lists, sets of radio buttons, or other types of controls.

At 414, instructions are provided for presenting the user interface on the client device. For example, the request handler 116 can provide the instructions for rendering the UI to the client device 130.

In some implementations, the method 400 can further include providing instructions for changing a presentation of the user interface for execution when the orientation of the device is changed. For example, the instructions that are provided by the request handler 116 can include instructions (e.g., in the form of HTML or other code) for re-rendering the user interface if a user of the client device 130 changes the orientation.

In some implementations, instructions for presenting elements of a user interface can identify, for each element, whether the element is to be included, the size to be used for presenting the element, if included, and the presentation plan for presenting the control associated with the element, if included. The instructions can be embedded, for example, in HTML.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example environment 100 may use processes with additional, fewer and/or different operations, as long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

What is claimed is:

1. A computer-implemented method comprising:
  identifying a plurality of elements available for use in a user interface associated with a software application executing on a client device, wherein the user interface is displayed on a computer display screen of the client device;
  identifying existing stored values currently being used for each of the elements;
  for each element in the plurality of elements, calculating an initial priority of the element based, at least in part, on counting instances of different values for the element;
  for each pair of elements, calculating predictive values based, at least in part, on value combinations for the plurality of elements, wherein a predictive value of a second element is calculated given a value of a first element, wherein the predictive value indicates a variability of values in the second element;
  for each element in the plurality of elements, calculating an importance of the element based, at least in part, on the initial priority of the element and the predictive values of the other elements;
  identifying physical display characteristics of the computer display screen;
  identifying specific elements for presentation in the user interface using rules based, at least in part, on specific values associated with the physical display characteristics of the computer display screen, based, at least in part, on an initial priority assigned to the element, wherein a layout of the elements on the user interface is based on the calculated importance of each element, the predictive values of the other elements in the plurality of elements or a sum of the initial priority of the element and each other element in the plurality of elements, and the identified physical display characteristics of the computer display screen;
  identifying a presentation plan specifying whether to present one or more controls associated with each identified element in the user interface, wherein the one or more controls are used to determine a presentation format for each identified element in the user interface;
  providing, using one or more processors, instructions to the client device for rendering the user interface on the computer display screen of the client device, wherein the provided instructions are generated by taking into account the identified specific elements for presentation, the identified layout of the elements on the user interface, and the identified presentation plan; and
  rendering the user interface on the computer display screen of the client device according to the provided instructions.

2. The computer-implemented method of claim 1, further comprising determining whether to change a size of each identified element when the user interface is rendered.

3. The computer-implemented method of claim 1, further comprising determining whether to display or hide an element in the user interface based, at least in part, on the calculated importance of a given element.

4. The computer-implemented method of claim 1, further comprising changing a size of the element in the user interface, wherein changing the size of the element includes one of changing the size of an image or changing the font size of text associated with the element.

5. The computer-implemented method of claim 4, wherein changing the size of the image includes cropping the image.

6. The computer-implemented method of claim 3, further comprising providing instructions for changing a presentation of the user interface for execution when an orientation of the client device is changed.

7. The computer-implemented method of claim 1, wherein a control type of the control is selected from a group comprising a selection menu, a drop-down list box, a selection list, and a set of radio buttons.

8. The computer-implemented method of claim 1, wherein identifying the specific elements for presentation includes using rules based at least in part on specific values associated with display characteristics of particular client devices.

9. The computer-implemented method of claim 1, wherein the elements are selected from a group comprising a field and an image.

10. The computer-implemented method of claim 1, wherein the instructions to identify, for each element:
whether the element is to be included;
the size to be used for presenting the element, if included; and
the presentation plan for presenting the control associated with the element, if included.

11. A computer-readable media, comprising one or more computer-readable instructions embodied on tangible, non-transitory media and operable when executed by at least one computer to:
identify a plurality of elements available for use in a user interface associated with a software application executing on a client device, wherein the user interface is displayed on a computer display screen of the client device;
identify existing stored values currently being used for each of the elements;
for each element in the plurality of elements, calculate an initial priority of the element based, at least in part, on counting instances of different values for the element;
for each pair of elements, calculate predictive values based, at least in part, on value combinations for the plurality of elements, wherein a predictive value of a second element is calculated given a value of a first element, wherein the predictive value indicates a variability of values in the second element;
for each element in the plurality of elements, calculate an importance of the element based, at least in part, on the initial priority of the element and the predictive values of the other elements;
identify physical display characteristics of the computer display screen;
identify specific elements for presentation in the user interface using rules based, at least in part, on specific values associated with the physical display characteristics of the computer display screen, based, at least in part, on an initial priority assigned to the element, wherein a layout of the elements on the user interface is based on the calculated importance of each element, the predictive values of the other elements in the plurality of elements or a sum of the initial priority of the element and each other element in the plurality of elements, and the identified physical display characteristics of the computer display screen;
identify a presentation plan specifying whether to present one or more controls associated with each identified element in the user interface, wherein the one or more controls are used to determine a presentation format for each identified element in the user interface;
provide, using one or more processors, instructions to the client device for rendering the user interface on the computer display screen of the client device, wherein the provided instructions are generated by taking into account the identified specific elements for presentation, the identified layout of the elements on the user interface, and the identified presentation plan; and
render the user interface on the computer display screen of the client device according to the provided instructions.

12. The computer-readable media of claim 11, further comprising one or more computer-readable instructions to determine whether to change a size of each identified element when the user interface is rendered.

13. The computer-readable media of claim 11, wherein determining whether to display or hide an element in the user interface is based, at least in part, on the calculated importance of a given element.

14. The computer-readable media of claim 11, further comprising one or more computer-readable instructions to change a size of the element in the user interface, wherein changing the size of the element includes one of changing the size of an image or changing the font size of text associated with the element.

15. The computer-readable media of claim 14, wherein changing the size of the image includes cropping the image.

16. A computer system, comprising:
memory operable to store content, including static and dynamic content; and
at least one hardware processor interoperably coupled to the memory and operable to perform instructions to:
identify a plurality of elements available for use in a user interface associated with a software application executing on a client device, wherein the user interface is displayed on a computer display screen of the client device;
identify existing stored values currently being used for each of the elements;
for each element in the plurality of elements, calculate an initial priority of the element based, at least in part, on counting instances of different values for the element;
for each pair of elements, calculate predictive values based, at least in part, on value combinations for the plurality of elements, wherein a predictive value of a second element is calculated given a value of a first element, wherein the predictive value indicates a variability of values in the second element;
for each element in the plurality of elements, calculate an importance of the element based, at least in part, on the initial priority of the element and the predictive values of the other elements;
identify physical display characteristics of the computer display screen;
identify specific elements for presentation in the user interface using rules based, at least in part, on specific values associated with the physical display characteristics of the computer display screen, based, at least in part, on an initial priority assigned to the element, wherein a layout of the elements on the user interface is based on the calculated importance of each element, the predictive values of the other elements in the plurality of elements or a sum of the initial priority of the element and each other element in the plurality of elements, and the identified physical display characteristics of the computer display screen;
identify a presentation plan specifying whether to present one or more controls associated with each identified element in the user interface, wherein the one or more controls are used to determine a presentation format for each identified element in the user interface;

provide, using one or more processors, instructions to the client device for rendering the user interface on the computer display screen of the client device, wherein the provided instructions are generated by taking into account the identified specific elements for presentation, the identified layout of the elements on the user interface, and the identified presentation plan; and render the user interface on the computer display screen of the client device according to the provided instructions.

17. The system of claim 16, further comprising instructions to determine whether to change a size of each identified element when the user interface is rendered.

18. The system of claim 16, wherein determining whether to display or hide an element is based, at least in part, on the calculated importance of a given element.

19. The system of claim 16, further comprising instructions to change a size of the element in the user interface, wherein changing the size of the element includes one of changing the size of an image or changing the font size of text associated with the element.

20. The system of claim 19, wherein changing the size of the image includes cropping the image.

* * * * *